US009013956B2

(12) United States Patent
Hill

(10) Patent No.: US 9,013,956 B2
(45) Date of Patent: Apr. 21, 2015

(54) METHOD AND SYSTEM FOR SEISMIC IMAGING AND EARTH MODELING USING BEAM TOMOGRAPHY

(75) Inventor: Norman Ross Hill, Houston, TX (US)

(73) Assignee: Chevron U.S.A Inc., San Ramon, CA (US)

( * ) Notice: Subject to any disclaimer, the term of this patent is extended or adjusted under 35 U.S.C. 154(b) by 822 days.

(21) Appl. No.: 12/606,861

(22) Filed: Oct. 27, 2009

(65) Prior Publication Data

US 2011/0096627 A1 Apr. 28, 2011

(51) Int. Cl.
*G01V 1/28* (2006.01)

(52) U.S. Cl.
CPC ............ *G01V 1/282* (2013.01); *G01V 2210/66* (2013.01)

(58) Field of Classification Search
CPC .......................... G01V 1/282; G01V 2210/66
USPC .............................. 367/50, 53, 73; 702/17, 16
See application file for complete search history.

(56) References Cited

U.S. PATENT DOCUMENTS

| 5,274,605 | A | 12/1993 | Hill |
| 6,882,938 | B2 | 4/2005 | Vaage et al. |
| 6,889,142 | B2 | 5/2005 | Schonewille |
| 7,373,252 | B2 * | 5/2008 | Sherrill et al. .................. 702/17 |
| 2006/0056272 | A1 * | 3/2006 | Hill .................................. 367/73 |
| 2008/0137480 | A1 * | 6/2008 | MacNeill ........................ 367/73 |
| 2009/0238040 | A1 | 9/2009 | Duncan |

OTHER PUBLICATIONS

Lee, 3-D full waveform inversion of seismic data: Part I. Theory, University of California, 2003, pp. 1-5.*
Bube et al., Hybrid minimization with applications to tomography, Geophysics, Jul.-Aug. 1997, pp. 1183-1195, vol. 62., No. 4,Society of Exploration Geophysicists.
Gray, Gaussian beam migration of common-shot records, 2005 Geophysics, vol. 70, pp. S71-S77.
Gray, Gaussian beam migration of common-shot records,Geophysics, Jul.-Aug. 2005, pp. S71-S77, vol. 70, No. 4, Society of Exploration Geophysicists.
Hill.Gaussian beam migration, Geophysics, Nov. 1990, pp. 1416-1428, vol. 655 No. 11, Society of Exploration Geophysicist.
Sun et al., 3-D prestack Kirchhoff beam migration for depth imaging, Geophysics, Sep.-Oct. 2000, pp. 1592-1603, vol. 65 No. 5, Society of Exploration Geophysicists.
Hill, Prestack Gaussian-beam depth migration, Geophysics, Jul.-Aug. 2001, pp. 1240-1250, vol. 66 No. 4, Society of Exploration Geophysicists.

(Continued)

*Primary Examiner* — Daniel L Murphy
(74) *Attorney, Agent, or Firm* — Marie L. Clapp

(57) ABSTRACT

A beam tomography computer implemented method and system for generating improved seismic images and earth models without dependence on reflector structure is disclosed. Recorded seismic data is transformed into data beams which are compared to forward modeled beams using an earth model having a velocity model to compute raypaths and a seismic image to specify the reflectors. The tomographic updates to the earth model and velocity model are based on misalignments between the data beams and the same beams forward modeled from the velocity model and the seismic image. The updated earth model and seismic image better describe the true propagation of the beams through the earth.

19 Claims, 17 Drawing Sheets

(56) References Cited

OTHER PUBLICATIONS

Biondi et al., "Focusing" eikonal equation and global tomography, Stanford Exploration Project, Report SERGEY, Nov. 9, 2000, pp. 403-417.*

A. Boutet de Monvel and R. Purice: "The conjugate operator method: application to Dirac operators and to stratified media", In: Evolution equations, Feshbach resonances, singular Hodge theory, Math. Top., vol. 16, Wiley-VCH, Berlin, p. 243-286, 1999.

Claerbout, J. F. Earth Soundings Analysis: Processing versus Inversion. Boston, MA: Blackwell Scientific Publication, p. 99, 106-107 (1992).

Leung et al., 2007, Eulerian Gaussian beams for high-frequency wave propagation, Geophysics,vol. 72, No. 5; p. SM61-SM76.

Klimes, L., Hermite-Gaussian Beams in Inhomogeneous Elastic Media, Studia Geophysica et Geodaetica , vol. 46, Issue 1 Supplement, pp. 55-66 2002.

Nowack et al., Correlation Migration Using Gaussian Beams of Scattered Teleseismic Body Waves, Bulletin of the Seismological Society of America, vol. 96, No. 1, pp. 1-10, 2006.

Claerbout, J. F.,Image Estimation by Example: Geophysical Soundings Image Construction (GEE), eBook, Stanford Exploration Project, 2004.

Albertin et al., Adjoint wave-equation velocity analysis, $76^{th}$ Ann. Internat. Mtg. Soc. Expl. Geophysicists, Expanded Abstracts, 2006.

Cerveny, V. et al., "Computation of wave fields in inhomogeneous media—Gaussian beam approach", Geophys. J.R. Astr. Soc., vol. 70, pp. 109-128, 1982.

Claerbout, J. F. Earth Soundings Analysis: Processing versus Inversion. Geophysics Stanford University, pp. 1-334, Mar. 2004.

Deregowski, S.M., "Common-offset migrations and velocity analysis", Firstbreak, vol. 8, No. 6; pp. 225-234, Jun. 1990.

Dix. C.H., "Seismic Velocities from Surface Measurements", Geophysics, vol. XX, No. 1, pp. 68-86, Jan. 1955.

Larner, K.L., et al., "Depth migration of imaged time sections", Geophysics, vol. 46, No. 5, pp. 734-750, May 1981.

Levin, F.K., "Apparent velocity from dipping interface reflections", Geophysics, vol. 36, No. 3, pp. 510-516, Jun. 1971.

Nolet, G., "Partitioned Waveform Inversion and Two-Dimensional Structure Under the Network of Autonomously Recording Seismographs", Journal of Geophysical Research, vol. 95, No. B6, pp. 8499-8516, Jun. 1990.

Plessix, R.E., "A review of the adjoint-state method for computing the gradient of a functional with geophysical applications", Geophys. J. Int., vol. 167, p. 495-503, Feb. 2006.

Pratt, R. G., "Seismic waveform inversion in the frequency domain, Part 1: Theory and verification in a physical scale model", Geophysics, vol. 64, No. 3, pp. 888-901, May-Jun. 1999.

Pratt, R. G. et al., "Seismic waveform inversion in the frequency domain, Part 2: Fault delineation in sediments using crosshole data", Geophysics, vol. 64, No. 3, pp. 902-914, May-Jun. 1999.

Woodward, M.J., dissertation: "Wave-equation tomography", Stanford Exploration Project No. 62, pp. 1-73, 1989.

* cited by examiner

METHOD AND SYSTEM FOR SEISMIC IMAGING AND EARTH MODELING USING BEAM TOMOGRAPHY

FIELD OF THE INVENTION

The present invention relates generally to methods and systems for seismic imaging and earth modeling, and more specifically, to traveltime reflection tomography methods which utilize beams as input data for the method.

BACKGROUND OF THE INVENTION

In the field of petroleum exploration, images of the Earth's subsurface are required for reservoir exploration and development. Seismic images of a subsurface region of the Earth created with different subsets of the recorded seismic data are often misaligned. FIG. 1 is an example illustration of an image of the Earth's subsurface resulting from seismic data recorded at different offsets. The solid lines represent the seismic image using near-offset seismic data; the dashed lines represent the image produced by far offset seismic data. These misalignments are usually caused by incorrect seismic velocities which produce distorted, unfocused subsurface images. Measured misalignment values can be analyzed to correct these velocities. This analysis is most often done by traveltime tomography, which compares recorded data to the results of forward modeling, or by the related process of migration velocity analysis, which compares the misalignments between migrated images, as is depicted in FIG. 1.

Standard traveltime reflection tomography methods include forward modeling to match synthetic data computed from an earth model to real recorded data. This match is achieved by making incremental changes to the earth model to find the velocity model that minimizes the mismatch between the reflection-event traveltimes of modeled and recorded data. A common way of correcting the misalignment is to raytrace from representative reflectors and use travel times along the rays to find velocity corrections that will best align modeled and real data. Likewise, migration velocity analysis analyzes traveltimes and velocities along reflection rays to bring the images from all offsets into alignment. Most often, the velocity corrections are calculated on a grid, such as is shown in FIG. 1. Rays are traced very densely from many reflection points along many reflection horizons. This raypath information is used to calculate the correction to the velocity model required in each grid cell to minimize the misalignments between the images from different data offset ranges.

Conventional traveltime reflection tomography and migration velocity analysis methods include reflector structure as part of the starting velocity model. This reflector structure might be interpreted horizons or could be a field of local dip measurements of an existing seismic image. In either case, the reflector structure will be uncertain where the image is degraded. The raypaths are very sensitive to the reflector structure: small changes in the dip of the reflector often cause the rays to go in greatly different directions. Moreover, multipathing of rays often occurs where seismic images are degraded. Thus, where the image is most in need of correction, the travelpath information needed to make the corrections is most uncertain. If the dip of the reflector is changed only slightly at the reflection point of a ray, the reflected part of the ray path will often be greatly changed to pass through a very different set of grid cells and thereby alter the inversion. A ray can also be very sensitive to other small-scale heterogeneity encountered along its path. This sensitivity is an artifact of the ray-based analysis, and is one of the primary reasons for current emphasis in the industry on wave-equation based inversions for developing accurate velocity models, even though such wave-equation methods lose much of the very useful geometric information provided by rays.

Instead of abandoning rays, and using wave equation methods, there is a need for a method that can combine the advantages of both to improve earth model seismic velocities and the resulting seismic images. In particular, there is a need for a traveltime reflection tomography method that is less sensitive to minor details of the velocity model, does not require an assumed reflector structure and works where reflection events are faulted and difficult to map as reflection surfaces.

SUMMARY OF THE INVENTION

Described herein are implementations of various embodiments of a beam tomography method and system for generating seismic images and earth models related to a subsurface region of the earth. Embodiments of the method retain some aspects both of rays and of wavefields to improve earth model seismic velocities and the resulting seismic images without dependence on reflector structure.

According to one implementation, a computer implemented method for generating a seismic image and earth model related to a subsurface region of the earth is disclosed. The method comprises: storing in a computer storage media a data beam set generated from recorded seismic data that samples a portion of the subsurface region; and utilizing a computer system comprising one or more processors configured to communicate with the computer storage media and execute one or more computer programs. A user executing one or more computer programs on the computer system performs operations comprising: migrating the data beam set, comprising a plurality of data beams, and an initial earth model, having an initial velocity model representative of the subsurface region, to generate a seismic image of the subsurface region; cross-correlating a modeled beam, derived from the seismic image and earth model, with a corresponding data beam within the data beam set; storing in the computer storage media beam pairs of cross-correlated modeled beams and data beams that for a measured time shift have a cross-correlation value that exceeds a determined threshold, and repeating the cross-correlating and storing operations until a determined number of corresponding data beams have been modeled; and inverting the measured time shifts to generate an updated earth model, having an updated velocity model, wherein the resulting updated earth model of the subsurface region is capable of generating an updated seismic image that accurately describes the propagation of the data beams through the subsurface region.

Optionally, the following additional embodiments are included: iteratively repeating the operations of migrating, cross-correlating, storing, and inverting until the measured time shifts are less than a determined tolerance or until alignment of the beam pairs is determined visually by a user; transforming the recorded seismic data into a data beam set using a local slant stacking operation; the recorded seismic data is recorded from at least two offsets; the migration is computed using Gaussian beam migration; the seismic image is summed along Gaussian beam wavefronts to form the modeled beam; the corresponding modeled beam and data beam are determined for a specific midpoint location, offset and dip; only a portion of the earth model is windowed for use to model the model beams; and the number of stored beam pairs at each midpoint location and offset is a predetermined parameter; the number of stored beam pairs has reached a predetermined parameter, each submitted beam pair for storage at its midpoint location and offset is compared to currently stored beam pairs for the same midpoint location and offset and will replace the currently stored beam pair having the lowest cross-correlation value if the submitted beam pair has a cross-correlation value that is greater than the currently stored beam pair cross-correlation value.

According to other implementations, additional embodiments include: the measured time shifts maximize the cross-correlation value between the pairs of modeled beams and data beams; each modeled beam is associated with a source ray and a receiver ray, determined from parameters of the corresponding data beam in the beam pair and initial velocity model, which are used to adjust corrections to the velocity model to reduce the measured time shifts between the beam pairs; the inversion includes calculating an integral of a slowness correction to the velocity model along the source ray and the receiver ray to determine the time shift necessary to align the beam pairs; corrections to the velocity model are penalized for increasing spatial variations or increasing roughness from the initial velocity model; parameters of the inversion are chosen interactively by a user; and storing in the computer storage media a cross-correlation value and a measured time shift for each pair of modeled beams and data beams having a cross-correlation value that exceed a determined threshold.

It should also be appreciated by one skilled in the art that the invention is intended to be used with a computer network which includes: a computer network configured to generate images related to a subsurface region of the earth, the system comprising: a computer storage device having computer readable computer storage media including a data beam set, comprising a plurality of data beams, generated from recorded seismic data that samples a portion of the subsurface region; a graphical user interface comprising a user input device and a display device, configured and arranged to display at least one seismic image of a subsurface region of the earth; and a computer system configured and arranged to execute computer-readable executable instructions stored in computer storage media. A user is enabled to perform a method comprising: migrating the data beam set and an initial earth model, having an initial velocity model representative of the subsurface region, to generate a seismic image of the subsurface region; cross-correlating a modeled beam, derived from the seismic image and earth model, with a corresponding data beam within the data beam set; storing in the computer storage media beam pairs of cross-correlated modeled beams and data beams that for a measured time shift have a cross-correlation value that exceeds a determined threshold, and repeating the cross-correlating and storing operations until a determined number of corresponding data beams have been modeled; and inverting the measured time shifts to generate an updated earth model, having an updated velocity model, wherein the resulting updated earth model of the subsurface region is capable of generating an updated seismic image that accurately describes the propagation of the data beams through the subsurface region.

According to another implementation, a computer system is configured to perform the operations of migrating, cross-correlating, storing, and inverting which are iteratively repeated until the measured time shifts are less than a determined tolerance or until alignment of the beam pairs is determined visually by a user.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other objects, features and advantages of the present invention will become better understood with regard to the following description, pending claims and accompanying drawings where:

FIG. 15(a) illustrates a seismic image generated from an earth model using a velocity model produced by several iterations of a standard reflection traveltime tomography. FIG. 15(b) illustrates the image after four iterations of beam tomography applied to the velocity model used to produce the image in FIG. 15(a) in accordance with embodiments of the invention.

DETAILED DESCRIPTION OF THE INVENTION

Figure 1:
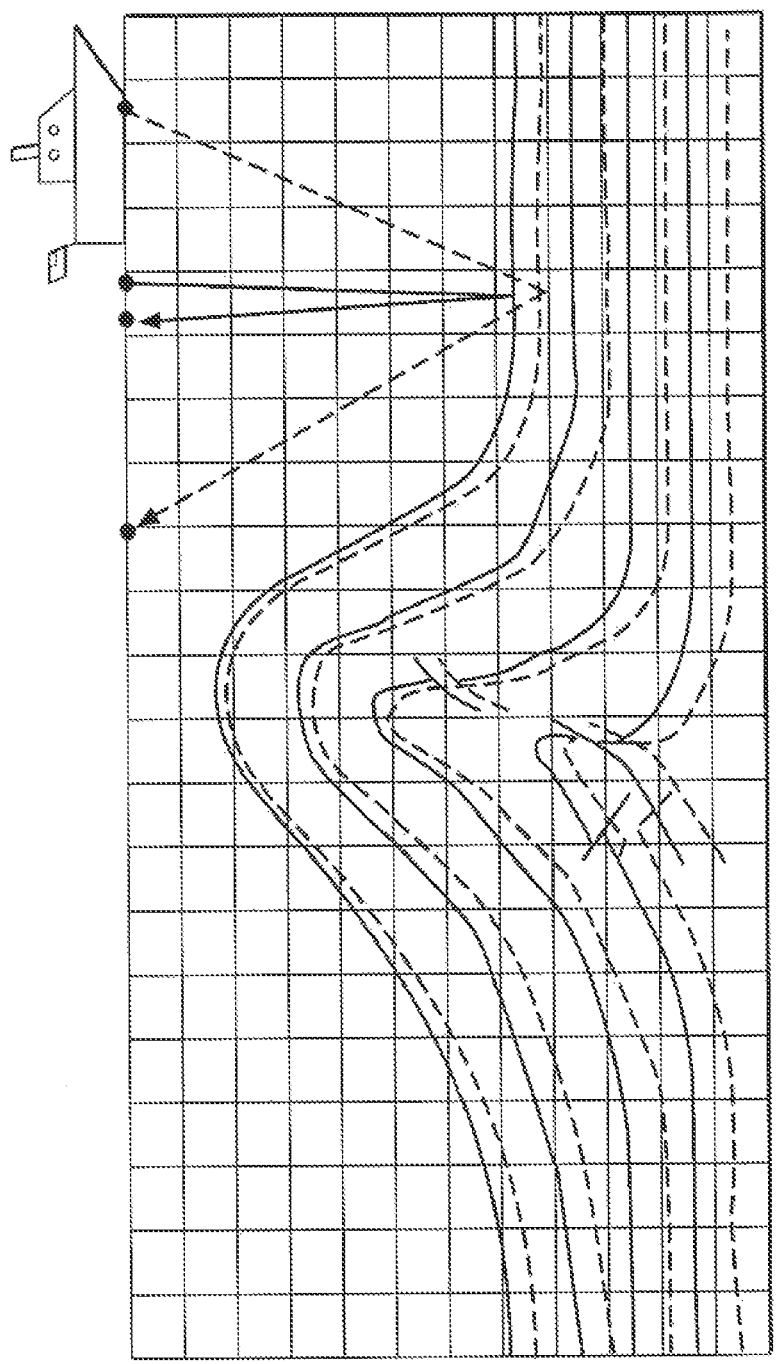
FIG. 1 illustrates an image of the earth's subsurface resulting from seismic data recorded at different offsets.
Figure 2:
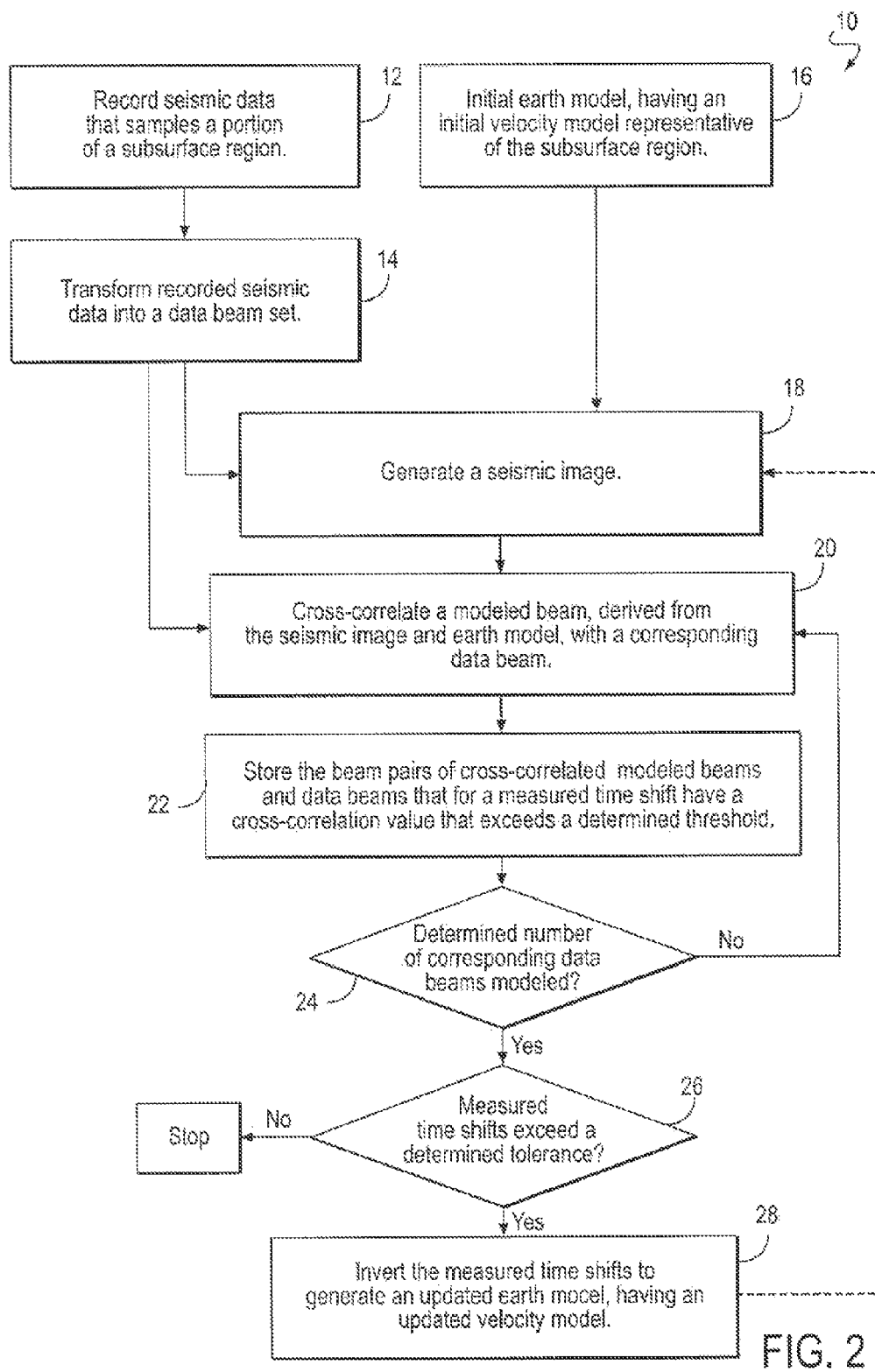
FIG. 2 illustrates a flowchart of a computer implemented method for refining a seismic velocity model and generating seismic images related to a subsurface region of the earth, in accordance with one or more embodiments of the invention.

FIG. 2 illustrates a flowchart of a computer implemented method 10 for refining a seismic velocity model and generating seismic images related to a subsurface region of the earth, in accordance with one or more embodiments of the invention. The operations of method 10 presented below are intended to be illustrative. In some embodiments, method 10 may be accomplished with one or more additional operations not described, and/or without one or more of the operations discussed. Additionally, the order in which the operations of method 10 are illustrated in FIG. 2 and described below is not intended to be limiting.

In embodiments of the invention, method 10 starts at an operation where recorded seismic data 12, that samples a portion of the subsurface region, is transformed into a data beam set 14 and is stored in a computer storage media. The recorded seismic data samples a portion of the earth's subsurface and typically has undergone preliminary processing to increase the signal-to-noise ratio and condition it for subsequent imaging processes. In some embodiments Gaussian beam migration, as described in Hill, N. R., *Gaussian Beam Migration*, Geophysics, Volume 55, pp. 1416-28 (1990) and Hill, N. R., *Prestack Gaussian Beam Migration*, Geophysics, Volume 66, pp. 1240-50 (2001) can be used for the transform operation, however, those skilled in the art will appreciate that other methods can be used, such as such as the beam method described by Sun, Y. et al., 3-*D Prestack Kirchhoff Beam Migration for Depth Imaging*, Geophysics, Volume 65, pp. 1592-1603 (2000).

Figure 3:
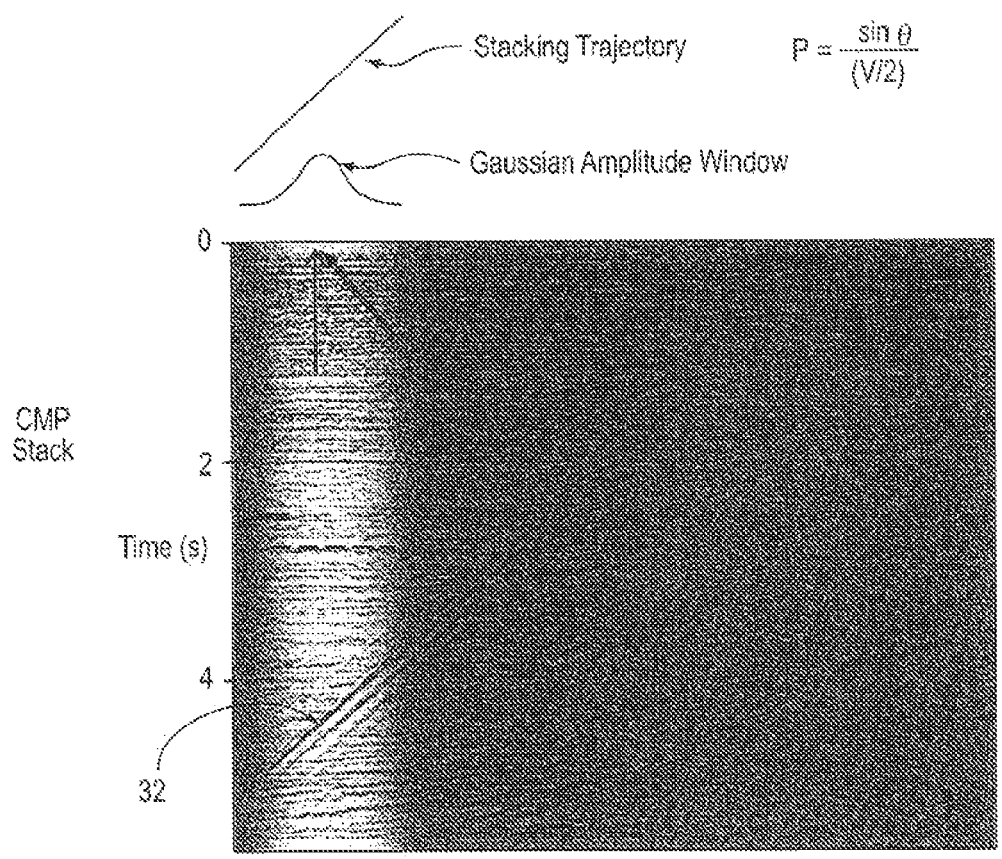
FIG. 3 illustrates beam steering the recorded seismic data in accordance with embodiments of the invention.

The recorded seismic data wavefield is separated into beam components. The separation describes the recorded subsurface region of interest as beams arriving at the earth's surface. FIG. 3 illustrates beam steering the recorded data, showing how a data beam is obtained from the recorded seismic data in accordance with embodiments of the invention. A beam is formed by a slant stack of traces located within a small spatial range or window within a Gaussian mask function. For this example, the seismic data recorded at a single offset (a common offset section COS) are windowed over a small range of midpoints. (In the case of FIG. 3, the data have been processed to represent data recorded at zero offset.) Within this range, the traces are weighted with a Gaussian function. After the traces are windowed and weighted, they are then slant stacked over the stacking trajectory shown in FIG. 3. This windowing and slant stacking operation separates a beam component from the recorded seismic energy, which arrives near the location of the window and arrives traveling in a direction near the slope of the stacking trajectory. This slant stacking is repeated for many different window positions and many different slopes to transform or steer the input recorded seismic data into a data beam set (hereinafter called "data beam(s)", or "data beam set"). The data beams comprising the data beam set are stored in computer storage media.

Referring back to FIG. 2, at operation 18 the initial earth model 16 and data beam set 14 are the input to a migration, which forms a seismic image of the subsurface region. The initial earth model 16 typically has been constructed by geological interpretation and geophysical analysis. For example, it may contain a model of a salt mass, which was constructed by extensive geological interpretation of existing seismic images, and the subsurface velocity model may have been determined by any number of tomographic methods known to those skilled in the art.

Figure 4:
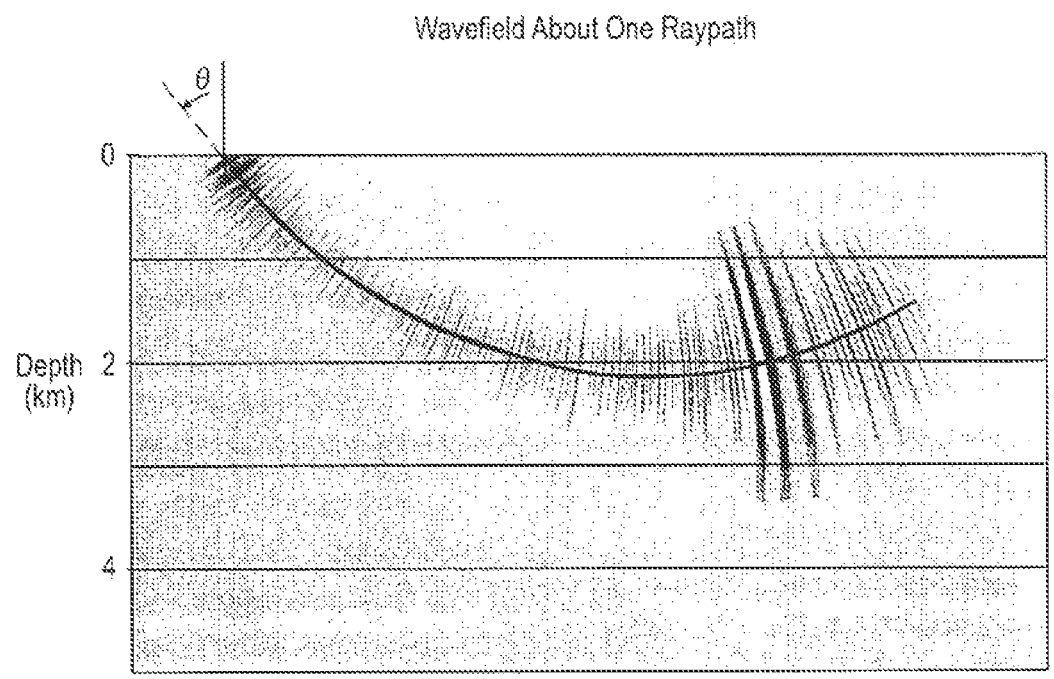
FIG. 4 illustrates propagation of a beam into the earth in accordance with embodiments of the invention.
Figure 5:
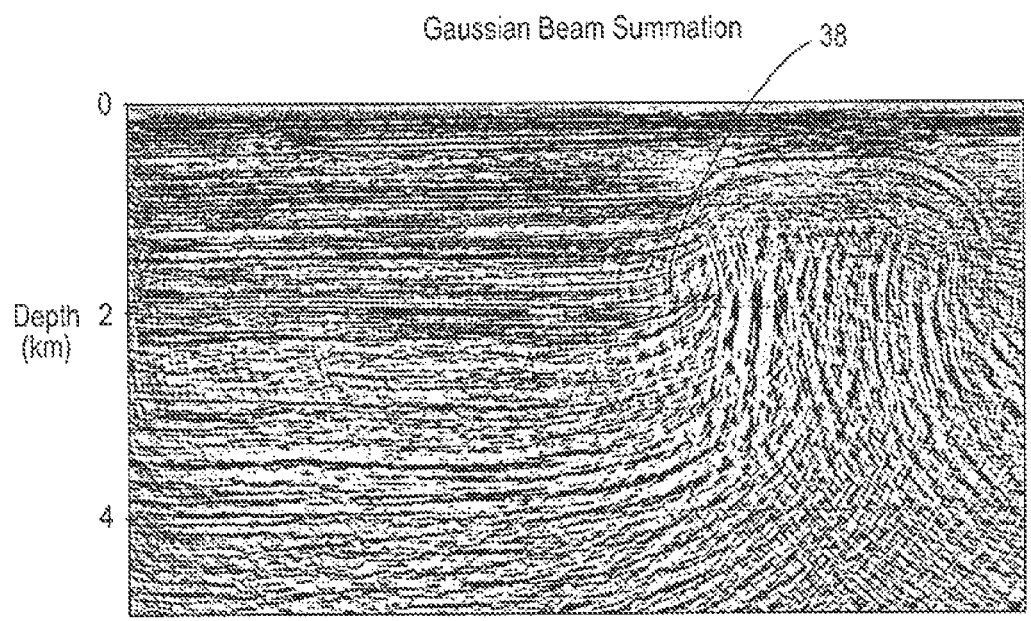
FIG. 5 illustrates summation of beams to form a seismic image in accordance with embodiments of the invention.
Figure 6:
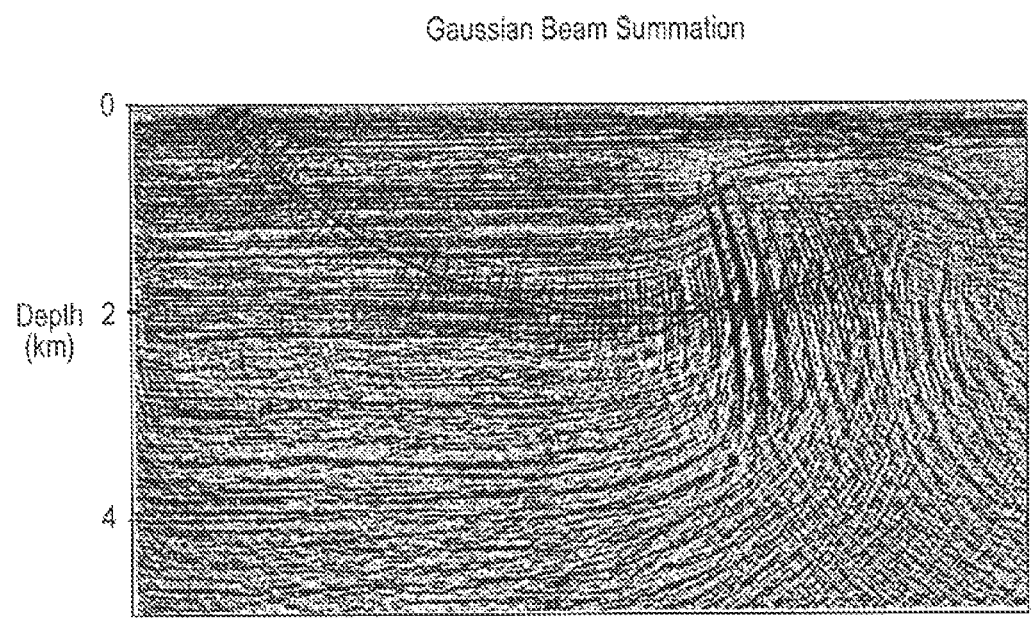
FIG. 6 illustrates superposition of one beam over the seismic image produced by summation of beams in accordance with embodiments of the invention.

In some embodiments, once the recorded seismic data are transformed into data beams, each of these data beams can be propagated into the initial earth model, using the Gaussian beam construction. FIG. 4 illustrates propagation of a zero-offset data beam into the earth in accordance with embodiments of the invention to derive a model beam. A snapshot of the data beam from FIG. 3 is shown in FIG. 4 after it has been propagated back into the initial earth model. In this example, the wavefield was constructed as a Gaussian beam about a single raypath for a broad range of frequencies, and all frequencies were summed to form the wavefield at time instance t=0. The wavefield is an approximate solution to the wave equation. If the wavefield were propagated forward in time according to the wave equation, it would arrive at the surface to produce the data beam component of the recorded wavefield obtained by the windowing and slant-stacking operation described for FIG. 3. When all data beam components, or the data beam set, are propagated back into the earth, using the initial earth model, and summed, the seismic image shown in FIG. 5 is produced. FIG. 6 shows the data beam of FIG. 4 superimposed on the seismic image in FIG. 5 in accordance with embodiments of the invention. This superposition shows that the event 32 beneath the Gaussian window in FIG. 3 that is dipping to the left at about 4.5 seconds is a reflection from the steep flank of the salt dome 38 that appears on the right side of FIG. 5. The Gaussian beam migration separates the beam component of energy from the seismic data that were recorded near the left hand side of the section shown in FIG. 3 at 32 and propagates it back to the position where it was reflected by the salt flank near the right hand side of the image of FIG. 5 at 38. Although Gaussian beam migration has been detailed in this example, those skilled in the art will appreciate that other migration methods can be used to generate the seismic image from the data beam set and initial earth model such as wave equation or Kirchhoff migration.

FIGS. 4 through 6 only illustrate the case of zero-offset data and assume the down-going raypath from the source coincides with the up-going raypath to the detector, as is usual with zero offset data. This simple case is used for illustration only and not intended to be limiting. In some embodiments, data recorded at least two different offset is utilized.

At operation 20, a modeled beam (hereinafter called "model beam(s)", "modeled beam(s)" or "model beam set"), derived from the seismic image and earth model, is cross-correlated with a corresponding data beam. To derive a modeled beam the steps in FIGS. 3 through 6 can be reversed in operation 20. Instead of steering the recorded seismic data into data beams and summing the data beams to form a seismic image, the seismic image is steered into model beams and directly compared to the data beams steered from the seismic data. If the velocity model utilized in the earth model were perfect, the data beams and model beams would be almost identical. To refine a realistic, imperfect earth model the match between the data beams and model beams is optimized at operations 20, 22, and 24 by iteratively changing the earth model velocities to maximize the cross-correlation between the data beams and model beams.

Figure 7:
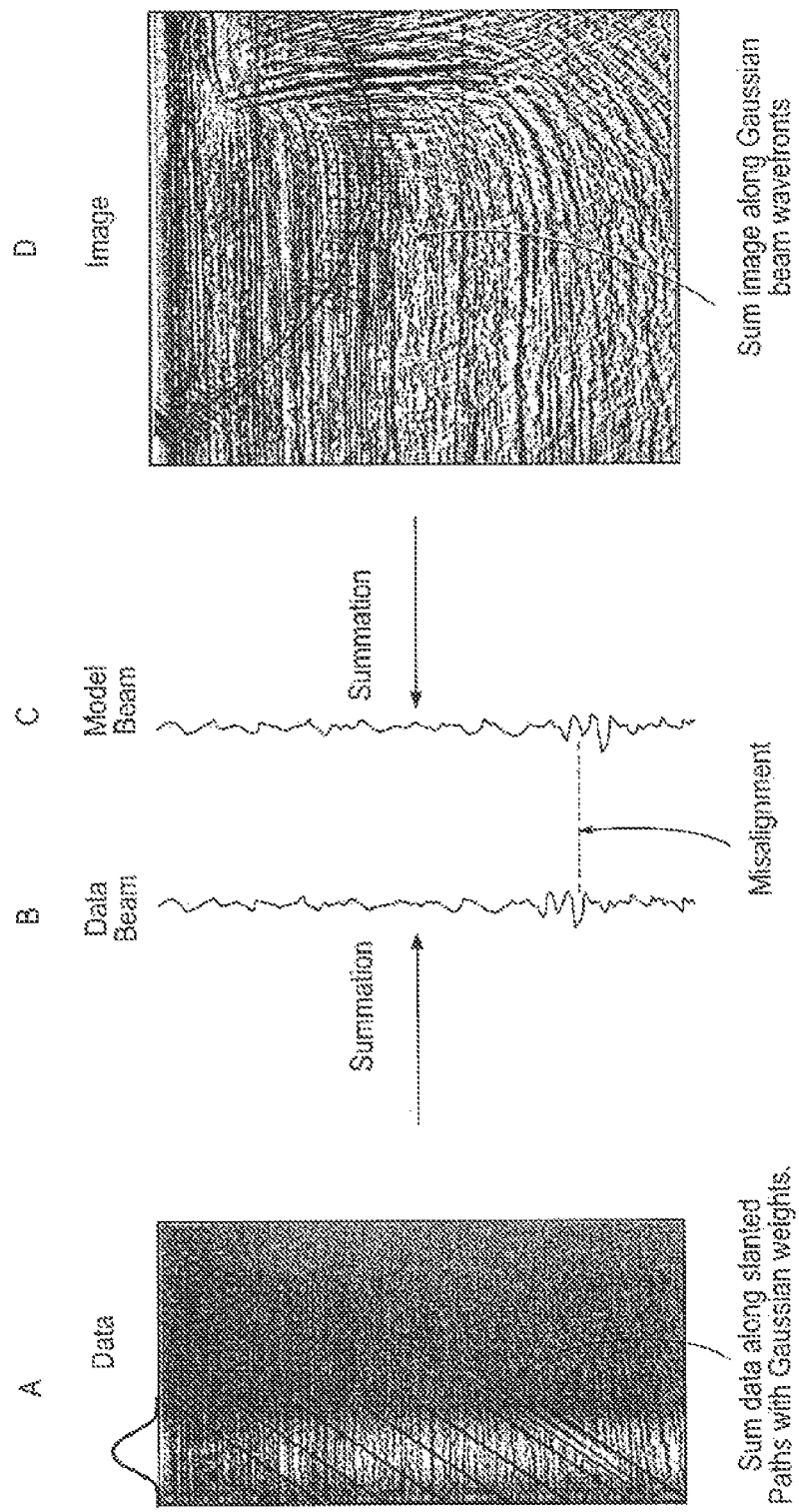
FIG. 7 illustrates a comparison of data and modeled results in the beam domain in accordance with embodiments of the invention.

FIG. 7 illustrates a comparison of data and modeled results in the beam domain in accordance with embodiments of the invention. In this example, the time-domain recorded seismic data A are transformed (steered) into beam components by the slant stacking operation already described to generate a data beam B. This data beam B is compared to a modeled beam C, formed from the seismic image by reversing the beam summation step that is used for migration. Rather than summing data beam components into the seismic image, as was described for FIGS. 3-6, the seismic image is instead summed along Gaussian beam wavefronts (superimposed) to form a modeled beam C. In some embodiments, the modeled beam is compared to the data beam at the same midpoint, offset, and dip by retrieving the corresponding data beam from the computer storage media.

The real part of the Gaussian beam complex travel time at a particular location determines the travel time at which a seismic image sample at that location is summed into the beam. The imaginary part of the complex travel times describes a time filtering operation along the modeled beam. The imaginary part, in some embodiments, is multiplied by a representative frequency, and this product can be used as an exponential weight when the seismic image sample is summed into the seismic image. In some embodiments, only a portion of the seismic image is used to generate the model beams. The portion can be a limited depth range that surrounds reflections of particular interest. For example, often deep reflection events are interpreted to be fairly continuous and structurally simple events, although the seismic image shows it to be discontinuous. A portion of the seismic image about this deep reflector can be windowed to limit the modeling of beams to this region of the seismic image. The result is a limited time range over which the modeled beams are non-zero. Therefore, the stored model and data beams pairs only range over the short time range that is sufficient to model reflections of the windowed portion of the seismic image.

The seismic image can be constructed with recorded seismic data from all of the recorded offsets. In some embodiments, however, the range of offsets included in the seismic image are restricted, for example, when the near offsets alone produce a strong image without significant interference from multiple reflections. In this case, a seismic image with contributions only from near offsets might be used to model beams as shown in FIG. 7, because far offset beams modeled using this near offset image would exhibit distinct misalignments with the corresponding data beams from the far offsets.

Referring back to FIG. 2, at operation 22 in some embodiments, beam pairs of cross-correlated modeled beams and data beams that for a measured time shift have a cross-correlation value that exceeds a determined threshold are stored in computer storage media and later used in the inversion steps, which begin at operation 26. The data beams and modeled beams are stored so that their quality can be inspected, visually and numerically, to enable an option to utilize processing steps such as filtering, for example, before the cross-correlation and time shifts are determined. Optionally, in some embodiments, only the cross-correlation value and the time shift are stored. At operation 24, it is determined if there are more corresponding data beams to model. If there are more corresponding data beams to model, in some embodiments, the process returns to operation 20 to model the next corresponding data beam. In some embodiments, the operations of cross-correlating and storing are repeated until a determined number of data beams have been modeled. For a typical 3D data set, $10^5$ to $10^7$ corresponding data beams are modeled and stored in the computer storage media.

The number of beam pairs stored at each location can be a predetermined parameter of the inversion. For example, if the number of pairs already stored at the midpoint location, offset and/or dip has not yet reached its maximum, then the submitted pair can be stored without comparison to the pairs already stored. If the number of pairs already stored has reached its maximum, then the submitted pair is compared to the other beam pairs that have already been stored for the same location, for example, the same midpoint location and offset. If the cross-correlation value of the submitted pair exceeds the cross-correlation value of a saved pair at the same location, then the submitted pair will be stored as a replacement for the saved pair with the least cross-correlation value. The compare-and-replace operations will result in storage of those beams pairs at each midpoint and offset that have maximum cross correlation.

Referring back to FIG. 2, once it is determined at operation 24 that there are no more beams to be modeled, in some embodiments, the inversion operations begin. The measured time shift that best aligns each of the modeled beams with their corresponding data beams is found. The criterion for the best alignment is the time shift that maximizes the cross-correlation value between the modeled beams and data beams. A measured time shift is stored in computer storage media and used in the inversion if the cross-correlation between the shifted beams exceeds a determined threshold at operation 26. If some measure of the measured time shifts is less than a predefined tolerance, the process may stop. In one embodiment this measure of the magnitude of time shifts is the root-mean-square value of all the shifts. If the time shifts exceed the predefined tolerance in operation 26, they are reduced by performing an inversion. In another embodiment, visual inspection of the alignment of the beam pair is used to determine if another iteration of the inversion will be performed.

The inversion operation 28 attempts to find corrections to the velocity model that will correct the residual misalignments between the modeled beams and the data beams. Each of the modeled beams is associated with a ray path that represents propagation of the source wavefield (hereinafter "source ray") and another ray path that represents propagation of the receiver wavefield (hereinafter "receiver ray"). These two paths are determined by their associated beam component of the recorded seismic data and the earth model velocity; they do not depend on any model of reflector structure. These ray paths pass through cells in a grid of velocity model corrections. The velocities in all of the cells are adjusted to model the measured time shifts between the modeled beams and data beams. This modeling generates an equation for every beam pair stored at operation 22. The integral of the slowness correction along the source ray and the receiver ray should be equal to the time shift necessary to align the modeled beams and data beams. Slowness is defined as the reciprocal of velocity.

To avoid unrealistically rough velocity and slowness corrections, the corrections are increasingly penalized for increasing spatial variations or increasing differences with the current Earth model velocities. These penalties are achieved by including additional equations, which are approximately satisfied, in each grid point. In some embodiments, the equations include: the change from the starting model is zero, which penalizes differences from the starting model; and the derivative of the slowness in the X, Y and Z directions will be zero, which penalizes roughness.

The approximate solution to the equations is achieved using an objective function. Suppose there are N cells in the grid of velocity (slowness) corrections and $M_t$ measured values of time shifts. Then the equations for time shifts and penalties results in the M-by-N linear system:

$$A*X=B, \quad (1)$$

where $M=M_t+4*N$ (for $M_t$ shift equations plus four constraint equations for each grid point). The system is conditioned by multiplying each row by a weight. Each row that is a travel-shift equation is weighted by the cross-correlation value of the aligned model beams and data beams. If the cross-correlation value is less than a user-determined value, then the equation of that particular time shift is discarded by eliminating that row from equation (1). User-determined weights are used for the rows that are constraint equations. These weights are chosen to control the roughness of the inversion velocity corrections. A different weight is used for the difference from the earth model velocities, the derivative in the Z direction and the derivative in the X and Y directions. This M-by-N linear system is used to construct an objective function for iteratively reweighted least squares, as is described in Bube, K. P. and Langanz, R. T., *Hybrid $l^1/l^2$ Minimization with Applications to Tomography, Geophysics*, Volume 62, pp. 1183-1195 (1997).

Many of the parameters of the inversion are chosen interactively. As an example the estimated default values for the penalty weights that are intended to produce a smooth result from the inversion. The user can observe both the roughness of the updates to the initial earth model velocities and the resulting alignment between the model and data beams. Based on this observation, the penalty weights might be reduced to allow a rougher model, which might produce better beam alignments. Also, the cross-correlation threshold, necessary for a particular measured alignment time shift could be changed to either allow or discard less similar modeled and data beam pairs. The frequency bandwidth used during the measurement of the alignments can be changed. Cycle skips, for example, can sometimes be avoided by using primarily the lower frequency components of the recorded seismic data. Also, the cells of the velocity model can be masked so that some of the cells are included and the update and others are excluded. For example, cells below the image region used to calculate modeled beam will be excluded from the update.

Updates to the velocity model are used to generate an updated earth model at operation 28, in some embodiments, the process is repeated by starting again at operation 18. Each iteration of the seismic image created at operation 18 is computed according to the then current updated earth model created at the previous operation 28. On each iteration, the seismic image will be more coherent thereby increasing the quality of the cross-correlation measurements made at operation 20. In addition, the raypaths associated with beams modeled at operation 20 will be computed with the then current updated earth model and will better describe the true propagation of the beams through the earth.

Figure 8:
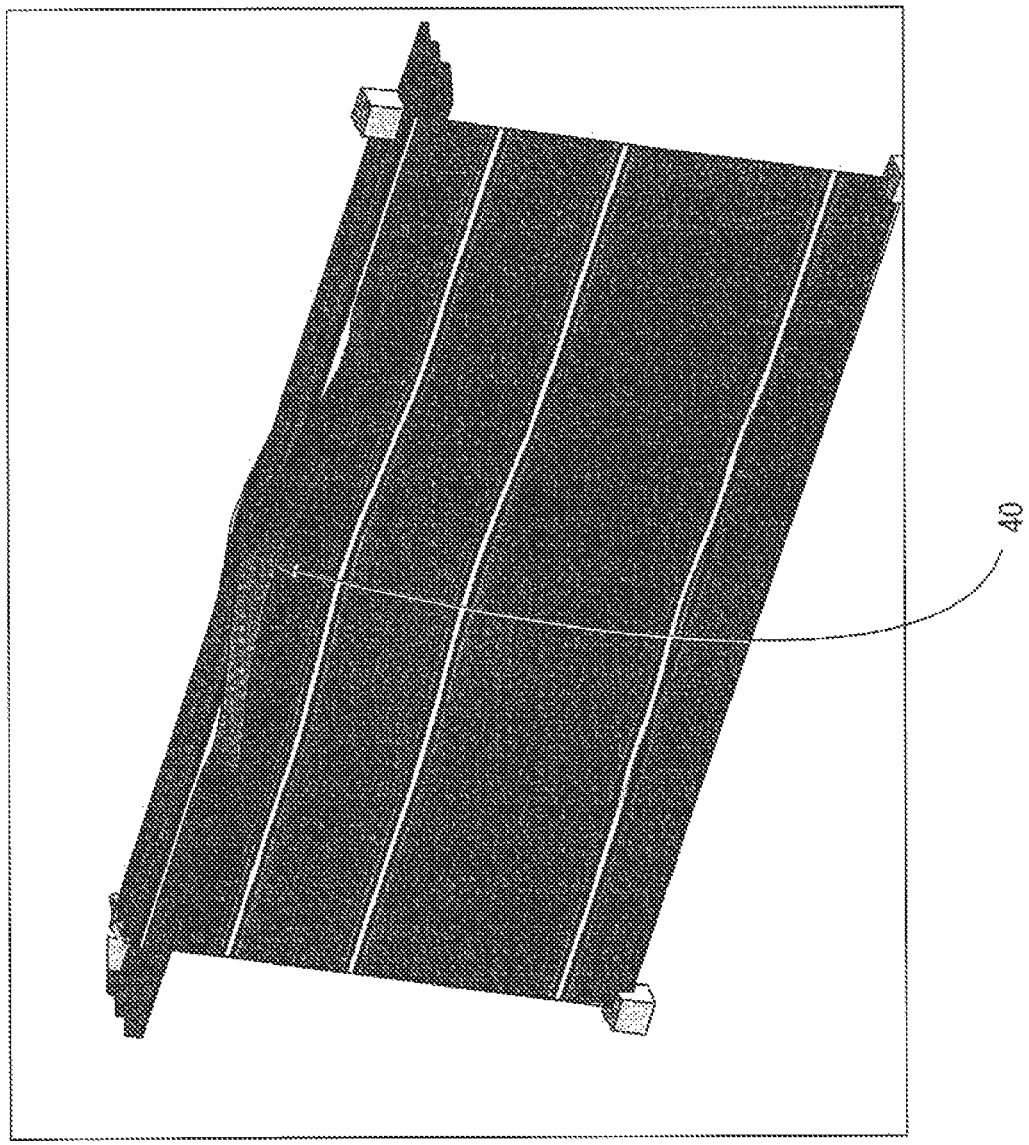
FIG. 8 illustrates a 3D view of a simple synthetic data example used to demonstrate embodiments of the invention.

FIG. 8 illustrates a 3D view of a simple synthetic data example used to demonstrate an embodiments of the invention. A slice through a subsalt image appears as a gray-scale plane. The figure shows the migrated seismic image beneath a surface that represents the bottom of salt. There is a large velocity contrast (15,000:10,000 feet per second) across the salt boundary. The seismic image and earth model above the bottom of salt are not shown. The synthetic data generated for the example used an initial earth model in which all the reflectors and the bottom of salt were flat and horizontal. The surface in the migration velocity model, however, has an erroneous bump. This erroneous bump causes the image of the subsalt reflections to be distorted. Reflections which should be flat are not flat in the seismic image of FIG. 8 because of the erroneous bump 40 in the starting initial velocity model.

Figure 9:
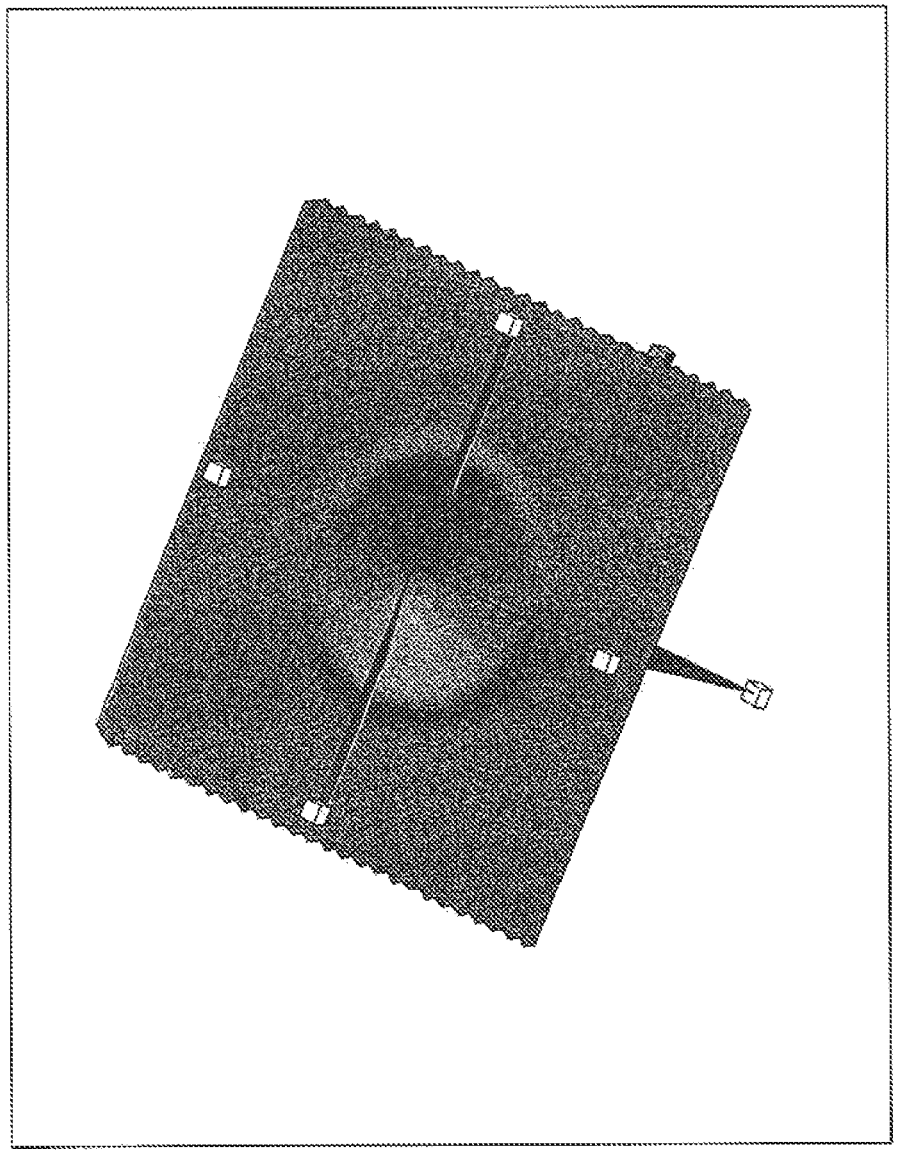
FIG. 9 illustrates an extended 3D view of the salt bottom of FIG. 8.

FIG. 9 illustrates an extended 3D view of the salt bottom of FIG. 8, showing the crater-shaped distortion that has been erroneously introduced into its shape. The crater shaped roughness of the surface is in error: the true shape is flat.

FIGS. 10 (a)-(c) illustrate data and model traces in beam space in accordance with embodiments of the invention. Each grey trace is paired with a black trace. Each grey trace is a modeled beam, the result of modeling a beam from the seismic image. The corresponding neighboring black trace is a data beam formed by transforming the recorded seismic data into beam components. Only a small depth range of the image in about the bottom reflector appearing in FIG. 8 was used as the seismic image. A short time interval coincident with the interval computed for the modeled beams is shown. Each of the trace pair corresponds to the data beams and model beams at a particular offset and midpoint location, and/or dip. Although the grey 52 and black 50 traces in each pair usually have very similar waveforms, they are shifted from one another in 10(a). This shift indicates that the data beams are not aligned with the model beams and will not sum into the seismic image with maximum coherency. This misalignment between the traces is caused by the erroneous bump in the shape of the salt bottom. 10(b) shows the model beams and data beams after they have been aligned by finding the time shift (shown as dashed lines at the top of the panel) that maximized their cross-correlation value. In this example, the time shifts are for beams that originate at one surface midpoint. Each grey-black pair corresponds to a different offset, with offset increasing toward the right in each of the three panels. The same alignments are calculated for beams at many offsets, surface locations and initial dips. The time shifts determined by these alignments are back projected along the ray paths which were used to construct the beams during the inversion process described previously. 10(c) shows the alignment achieved by time shifting the traces according to the velocity updates to the earth model produced by one iteration of method 10, FIG. 2.

Figure 10C:
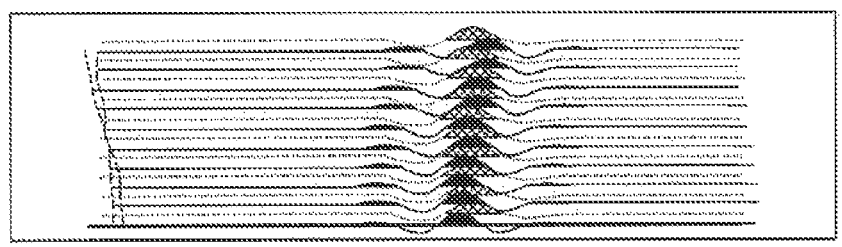
FIG. 10(a)-(c) illustrate data and model traces in beam space in accordance with embodiments of the invention.
Figure 10B:
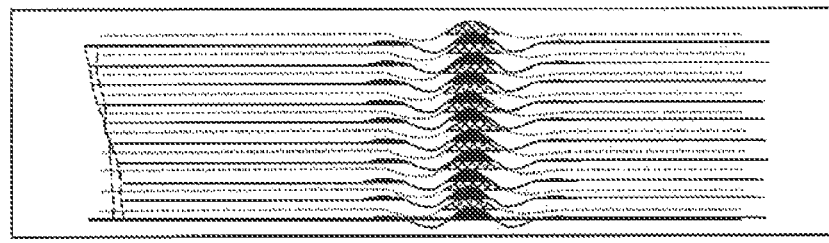
Figure 10A:
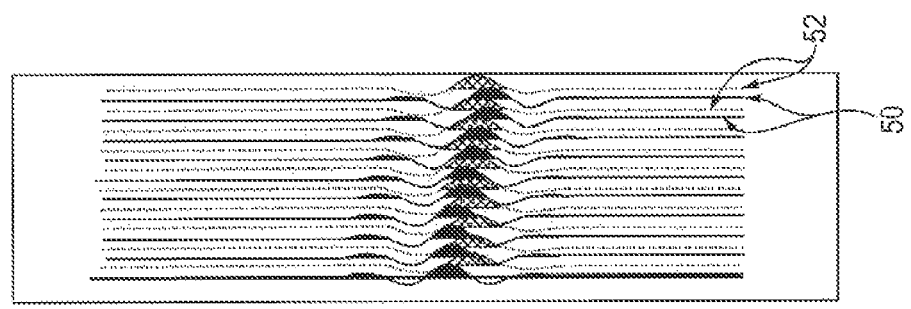
Figure 11:
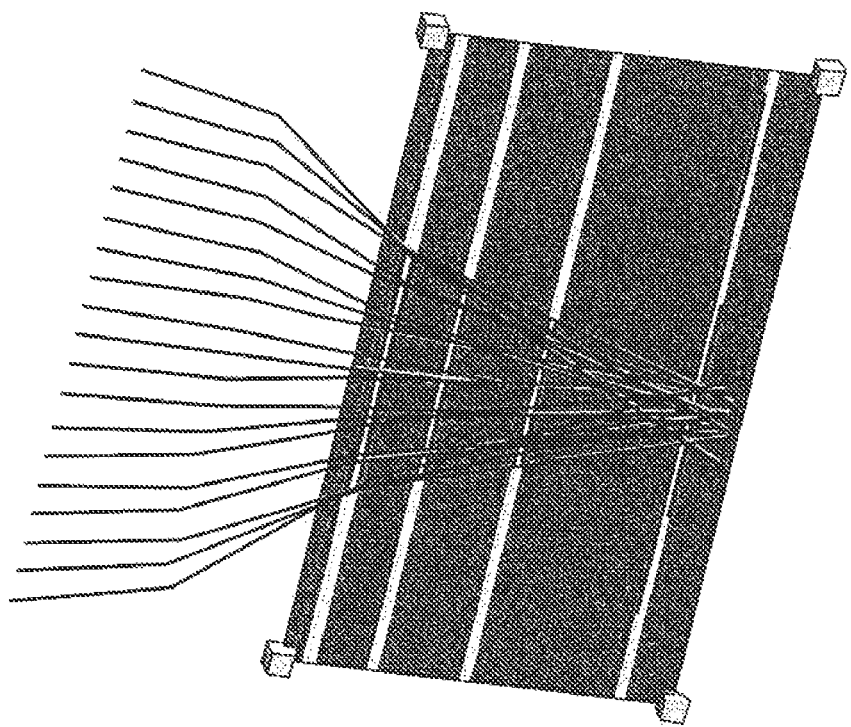
FIG. 11 illustrates the central ray paths associated with the beam traces appearing in FIG. 10 in accordance with embodiments of the invention.

FIG. 11 illustrates the ray paths associated with the beam traces appearing in FIGS. 10(a)-(c) in accordance with embodiments of the invention. For each offset at the midpoint location, there is a source ray for the propagation of the down-going source wavefield and a receiver ray for the propagation of the upcoming wavefield recorded at the receivers.

Figure 12:
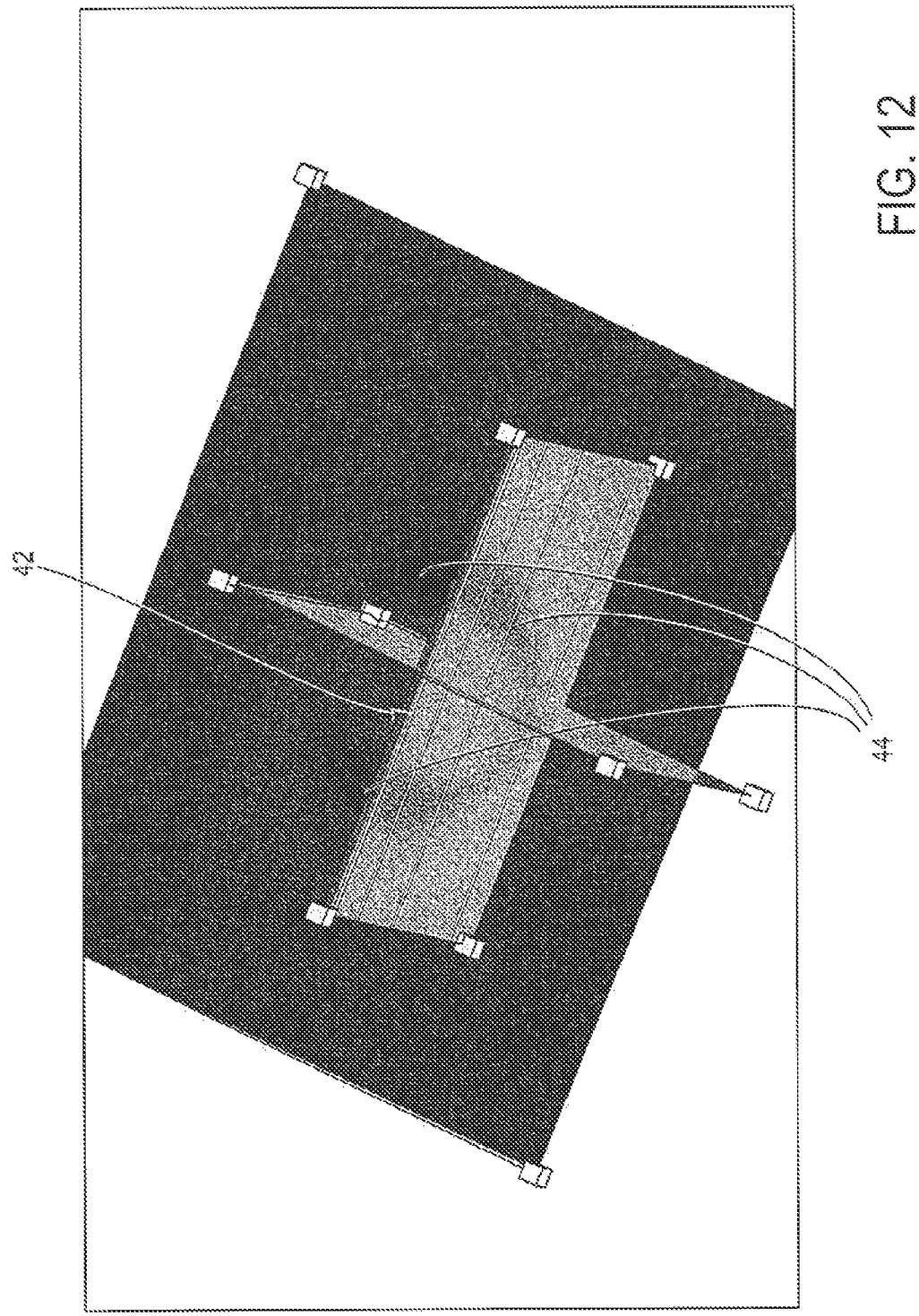
FIG. 12 illustrates a horizontal slice through the velocity model update produced by one iteration of the beam tomography method.

FIG. 12 illustrates a horizontal slice through the updated velocity model produced by one iteration of the beam tomography method. The velocity updates are computed on a three-dimensional grid. The increases 42 (shown as the area inside the darker ring) and decreases 44 (shown as the darker ring) in velocity appear near the salt bottom and compensate for the erroneous travel times caused by the erroneous rough shape of the salt bottom shown in FIG. 8. For the present example, the velocity updates were constrained to be near the salt bottom. Travel time changes computed by integrating the slowness updates along the existing rays result in the beam alignment shown in FIG. 10 (c). The alignment is much improved for the near to mid offsets, but there are still residual misalignment at the far offsets. Further iterations of the inversion process with updated seismic images and ray paths will improve the alignment over the entire offset range.

Figure 13:
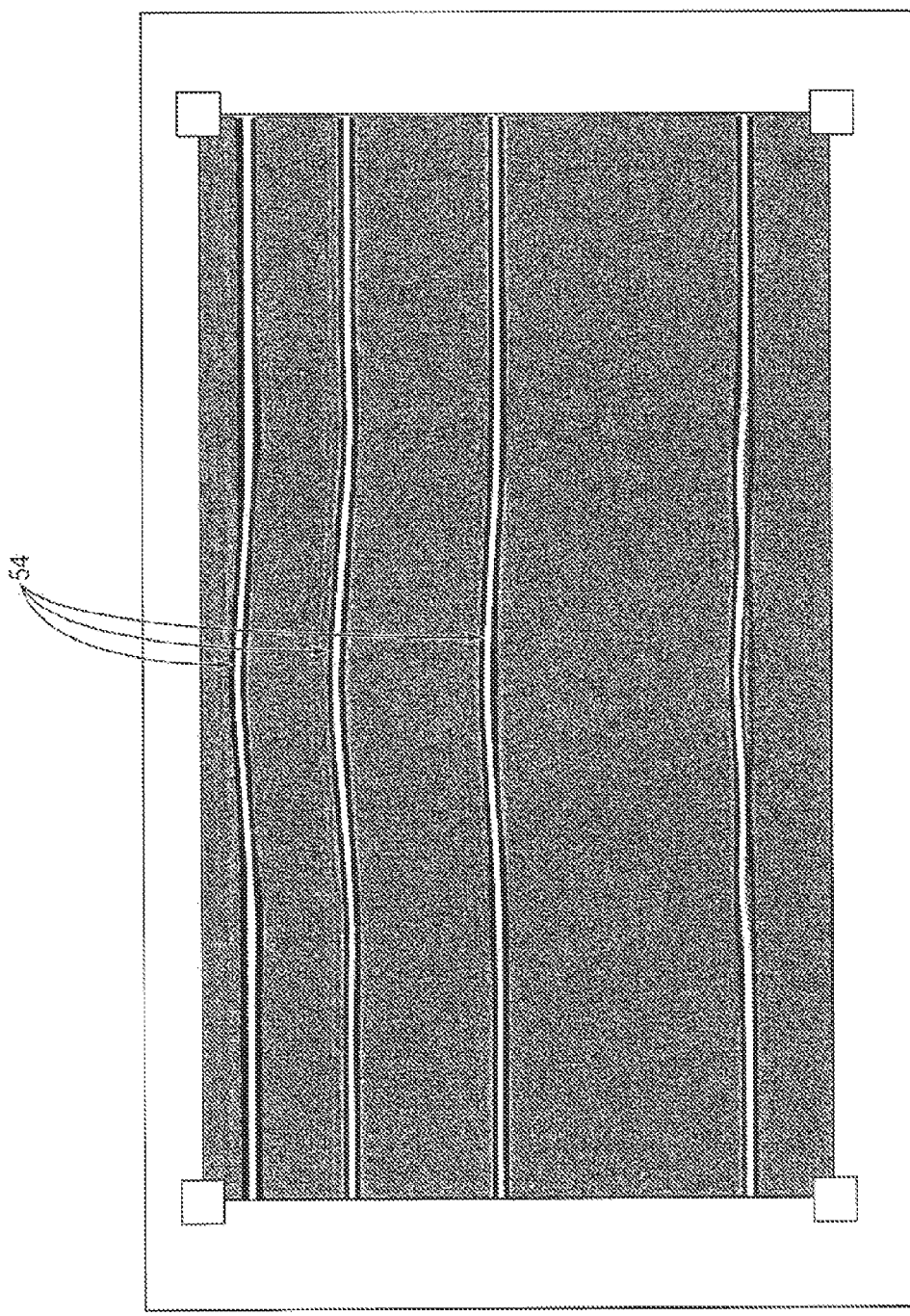
FIG. 13 illustrates the initial seismic image before application of beam tomography in accordance with embodiments of the present invention.
Figure 14:
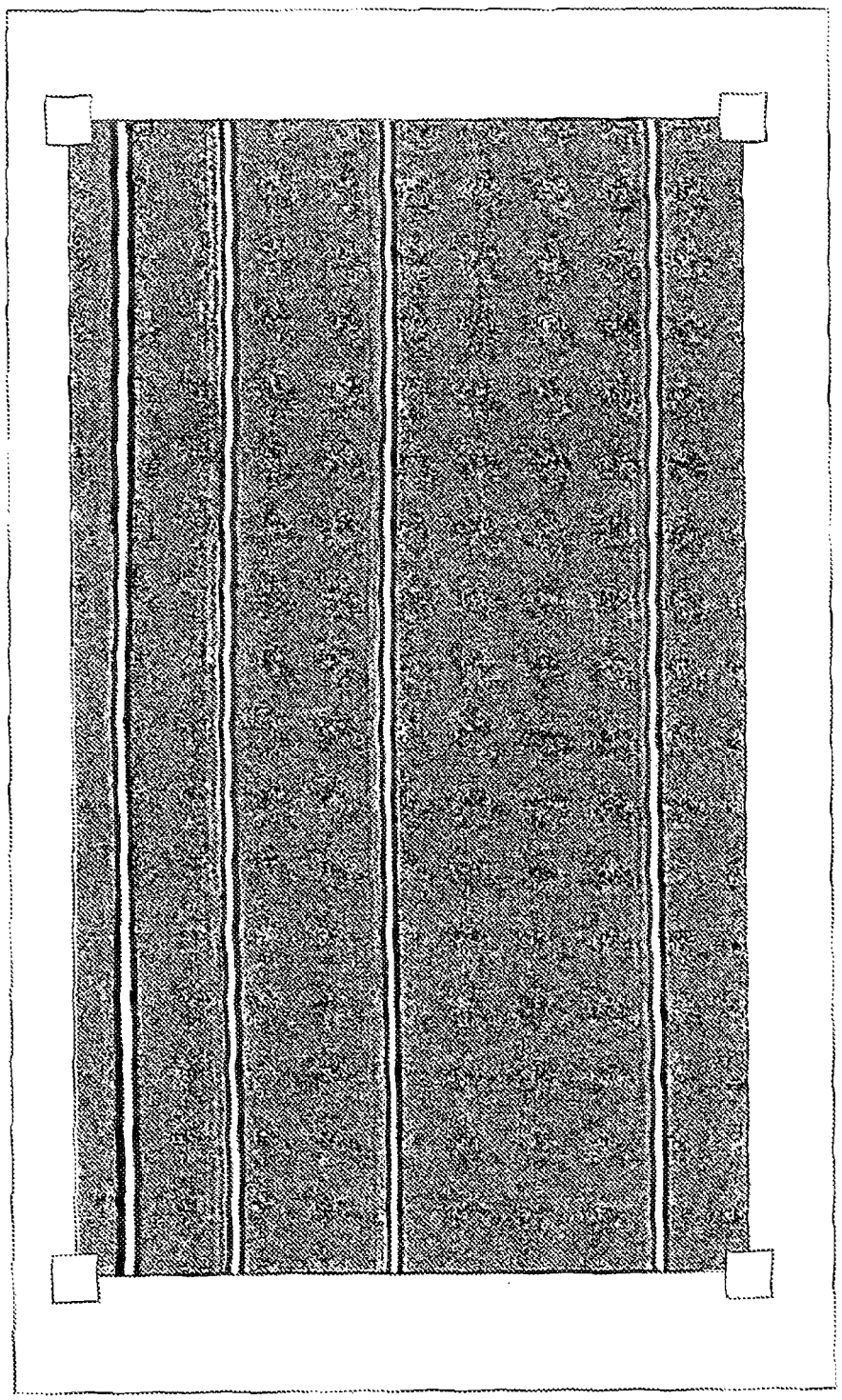
FIG. 14 illustrates the seismic image after several iterations of beam tomography in accordance with embodiments of the invention.

FIG. 13 illustrates the seismic image before application of beam tomography method in accordance with embodiments of the invention, showing the distortions 54 in subsalt reflectors that are caused by the erroneous bump 40 in the bottom of the salt shown in FIG. 8. Several iterations of the beam tomography method result in the seismic image shown in FIG. 14. The image has become much more coherent, and the reflectors are much closer to their true flat shape.

Figure 15A:
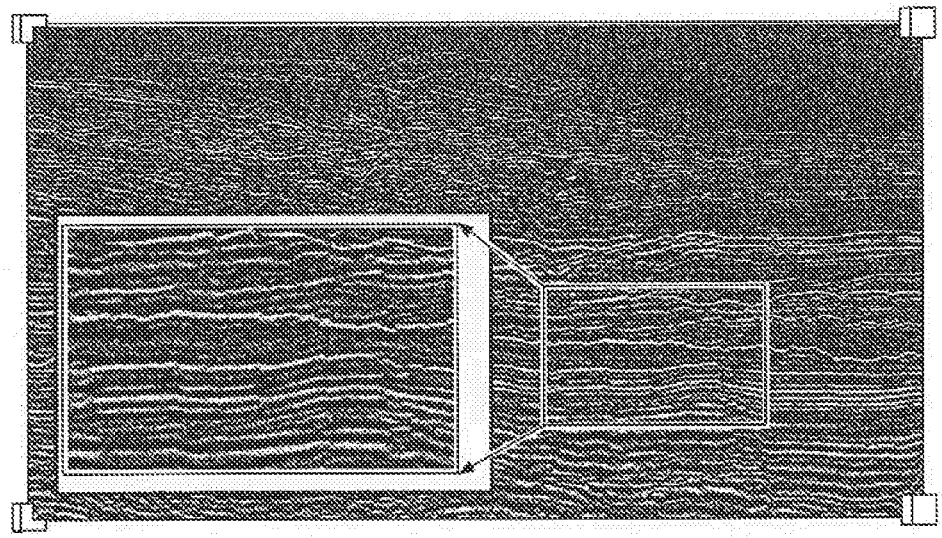
FIGS. 15(a)-(b) illustrate seismic images.
Figure 15B:
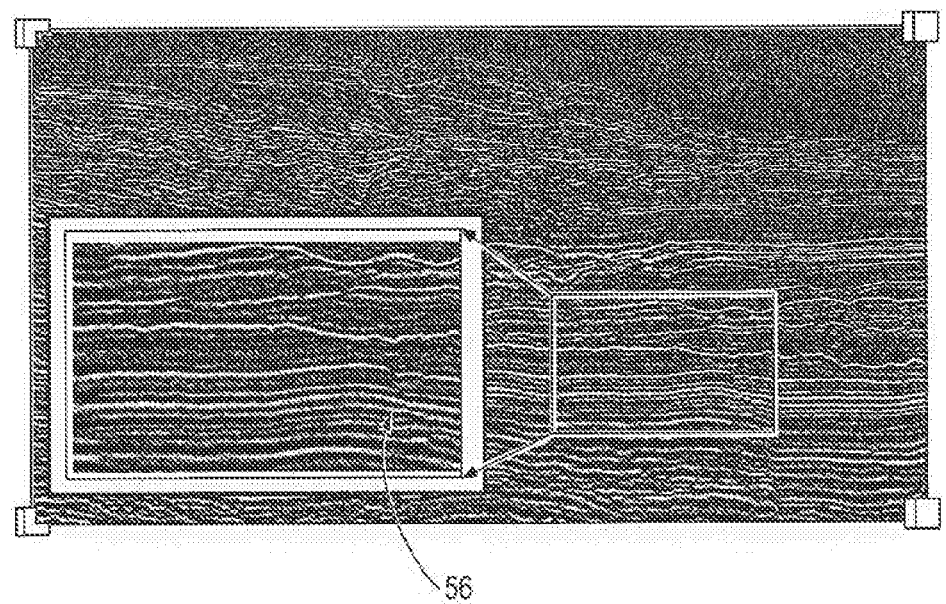
Figure 16:
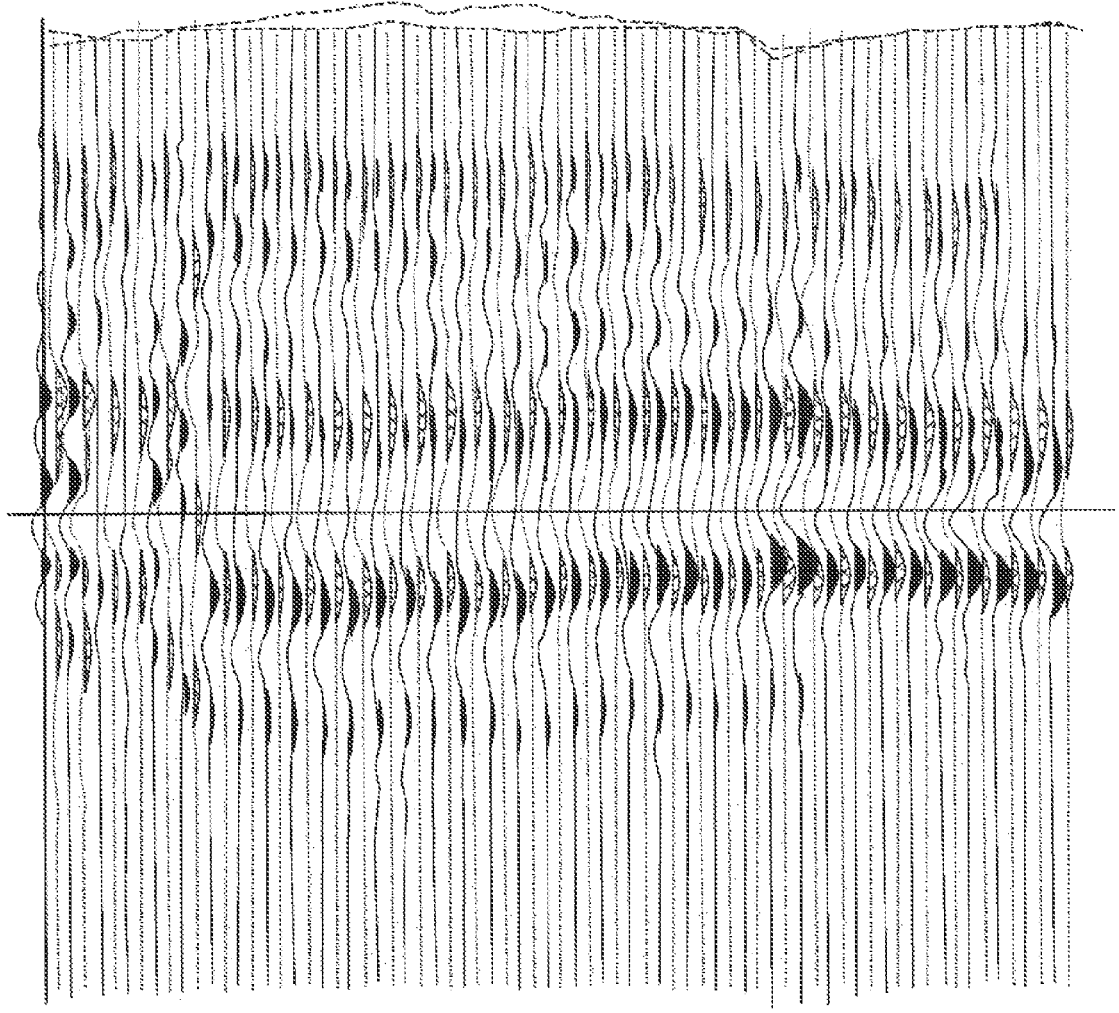
FIG. 16 illustrates the model beams and data beams and the time shifts utilized to maximize the cross-correlations in accordance with embodiments of the invention.

FIGS. 15-16 illustrate the beams alignment procedure with real data. Canyons in the sea floor cause lateral variations in seismic velocity, which if uncorrected, will distort and degrade the seismic image. The slower velocity of water within the canyons cause the main distortions. Further distortions, however, result from the geomechanical stresses induced in the rocks near the canyons and by buried canyons and other heterogeneity. FIGS. 15(a)-(b) illustrate seismic images. FIG. 15(a) shows a depth-migrated image after several iterations of standard travel-time reflection tomography. The highlighted and zoomed region in FIG. 15(a) shows breaks and distortions in reflection events. FIG. 15b is the same portion of the seismic image after four iterations of beam tomography applied to the velocity model used to produce the image in FIG. 15(a) in accordance with embodiments of the invention. Much of the distortion has been removed and the reflection events are more coherent. A true fault in the bedding 56, however, remains in the image. To obtain this result, model beams were formed for the strong mostly continuous reflection events occurring near the bottom depth section in FIG. 15. FIG. 16 is an example of the model beams and data beams and the time shifts utilized to maximize the cross-correlations in accordance with embodiments of the invention. In this example, the model beams (grey traces) are compared to the beams formed from the seismic data (black traces) for all offsets at one midpoint location. The dashed lines across the top of the traces are the time shifts needed to maximize the cross correlations and the shifts achieved with one iteration of the beam tomography method.

Figure 17:
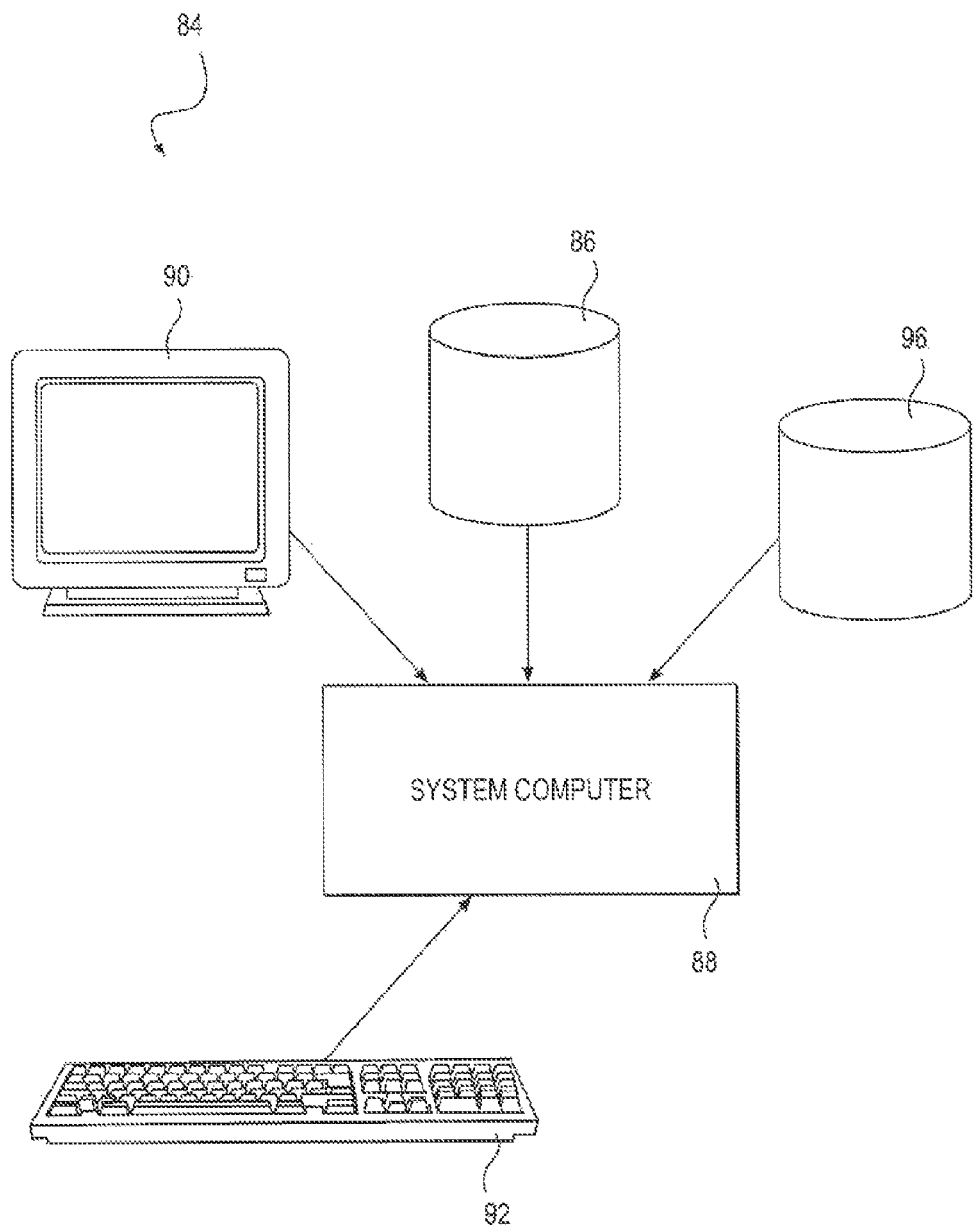
FIG. 17 schematically illustrates an example of a computer system for performing the invention.

FIG. 17 schematically illustrates an example of a computer network 84, into which implementations of various embodiments described herein may be implemented. The computer network 84 may include a data processing system or computer system 88, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, Linux computers, mainframe computers, and the like.

The computer system 88, comprising at least one processor, may be in communication with computer storage media, for example, disk storage or memory devices 86 and 96, which may be external hard disk storage devices. It is contemplated that disk storage devices 86 and 96 are conventional hard disk drives, and as such, will be implemented by way of a local area network or by remote access. Of course, while disk storage devices 86 and 96 are illustrated as separate devices, a single disk storage device may be used to store any and all of the program instructions, measurement data, and results as desired.

In one implementation, data related to the subsurface region of interest may be stored as computer storage media in disk storage device 96. The computer system 88 may retrieve the appropriate data from the disk storage device 96 to process the data according to program instructions that correspond to implementations of various technologies described herein. The program instructions may be written in a computer programming language, such as C++, Java and the like. The program instructions may be stored in a computer-readable medium, such as program disk storage device 86. Such computer-readable media may include computer storage media and communication media. Computer storage media may include volatile and non-volatile, and removable and non-removable media implemented in any method or technology for storage of information, such as computer-readable instructions, seismic data, structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 88. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the computer system 88 may include graphical user interface (GUI) components such as a graphics display 90 and a keyboard 92 which can include a pointing device (e.g., a mouse, trackball, or the like, not shown) to enable interactive operation. The GUI components may be used both to display data and processed data products and to allow the user to select among options for implementing aspects of the method. The computer system 88 may store the results of the methods described above on disk storage 86, for later use and further analysis.

The computer system 88 may be located at a data center remote from the data acquisition region or processing facility (not shown). The computer system 88 may be in communication with the data acquisition receivers (either directly or via a recording unit, not shown), to receive signals indicative of the geophysical properties of the subsurface region of interest. These signals, after conventional formatting and other initial processing may be stored by the computer system 88 as digital data in the disk storage 96 for subsequent retrieval and processing in the manner described above. While FIG. 19 illustrates the disk storage 96 as directly connected to the computer system 88, it is also contemplated that the disk storage device 96 may be accessible through a local area network or by remote access. Furthermore, while disk storage devices 86 and 96 are illustrated as separate devices for storing input data and analysis results, the disk storage devices 86 and 96 may be implemented within a single disk drive (either together with or separately), or in any other conventional manner as will be fully understood by one of skill in the art having reference to this specification.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. All patents and publications referenced herein are hereby incorporated by reference to the extent not inconsistent herewith.

What is claimed is:

1. A computer-implemented method of generating a seismic image and earth model related to a subsurface region of the earth, the method comprising:

storing in a computer storage media, a data beam set generated from recorded seismic data that samples a portion of the subsurface region;

utilizing a computer system comprising one or more processors configured to communicate with the computer storage media and execute one or more computer programs configured for performing operations comprising:

migrating the data beam set, comprising a plurality of data beams, using as input an initial earth model having an initial velocity model representative of the subsurface region, to generate a seismic image of the subsurface region;

cross-correlating a modeled beam, derived from the seismic image and earth model, with a corresponding data beam within the data beam set;

storing in the computer storage media beam pairs of cross-correlated modeled beams and data beams that for a measured time shift have a cross-correlation value that exceeds a determined threshold, and repeating the cross-correlating and storing operations until a determined number of corresponding data beams have been modeled; and inverting the measured time shifts to generate an updated earth model, having an updated velocity model, wherein the resulting updated earth model of the subsurface region is capable of generating an updated seismic image that accurately describes the propagation of the data beams through the subsurface region.

2. The method of claim 1 wherein the operations of migrating, cross-correlating, storing, and inverting are iteratively repeated until the measured time shifts are less than a determined tolerance or until alignment of the beam pairs is determined visually by a user.

3. The method of claim 1 wherein the recorded seismic data is transformed into a data beam set using a local slant stacking operation.

4. The method of claim 1 wherein the recorded seismic data is recorded from at least two offsets.

5. The method of claim 1 wherein the migration is computed using Gaussian beam migration.

6. The method of claim 1 wherein the seismic image is summed along Gaussian beam wavefronts to form the modeled beam.

7. The method of claim 1 wherein the corresponding modeled beam and data beam are determined for a specific midpoint location, offset and dip.

8. The method of claim 1 wherein only a portion of the earth model is windowed for use to model the model beams.

9. The method of claim 1 wherein the number of stored beam pairs at each midpoint location and offset is a predetermined parameter.

10. The method of claim 9 wherein when the number of stored beam pairs has reached a predetermined parameter, each submitted beam pair for storage at its midpoint location and offset is compared to currently stored beam pairs for the same midpoint location and offset and will replace the currently stored beam pair having a lowest cross-correlation value if the submitted beam pair has a cross-correlation value that is greater than the currently stored beam pair cross-correlation value.

11. The method of claim 1 wherein the measured time shifts maximize the cross-correlation value between the pairs of modeled beams and data beams.

12. The method of claim 1 wherein each modeled beam is associated with a source ray and a receiver ray, determined from parameters of the corresponding data beam in the beam pair and initial velocity model, which are used to adjust corrections to the velocity model to reduce the measured time shifts between the beam pairs.

13. The method of claim 12 wherein the inversion includes calculating an integral of a slowness correction to the velocity model along the source ray and the receiver ray to determine the time shift necessary to align the beam pairs.

14. The method of claim 12 wherein corrections to the velocity model are penalized for increasing spatial variations or increasing roughness from the initial velocity model.

15. The method of claim 1 wherein parameters of the inversion are chosen interactively by a user.

16. A computer network configured to generate images related to a subsurface region of the earth, the system comprising:

a computer storage device having computer readable computer storage media including a data beam set, comprising a plurality of data beams, generated from recorded seismic data that samples a portion of the subsurface region;

a graphical user interface comprising a user input device and a display device, configured and arranged to display at least one seismic image of a subsurface region of the earth; and a computer system configured and arranged to execute computer-readable executable instructions stored in computer storage media for enabling a user to perform a method comprising:

migrating the data beam set, using as input an initial earth model having an initial velocity model representative of the subsurface region, to generate a seismic image of the subsurface region;

cross-correlating a modeled beam, derived from the seismic image and earth model, with a corresponding data beam within the data beam set;

storing in the computer storage media beam pairs of cross-correlated modeled beams and data beams that for a measured time shift have a cross-correlation value that exceeds a determined threshold, and repeating the cross-correlating and storing operations until a determined number of corresponding data beams have been modeled; and inverting the measured time shifts to generate an updated earth model, having an updated velocity model, wherein the resulting updated earth model of the subsurface region is capable of generating an updated seismic image that accurately describes the propagation of the data beams through the subsurface region.

17. The method of claim 16 wherein the operations of migrating, cross-correlating, storing, and inverting are iteratively repeated until the measured time shifts are less than a determined tolerance or until alignment of the beam pairs is determined visually by a user.

18. A computer-implemented method of generating images related to a subsurface region of the earth, the method comprising:

storing in a computer storage media a data beam set, comprising a plurality of data beams, generated from recorded seismic data that samples a portion of the subsurface region;

utilizing a computer system comprising one or more processors configured to communicate with the computer storage media and execute one or more computer programs configured for performing operations comprising:

migrating the data beam set, using as input an initial earth model having an initial velocity model representative of the subsurface region, to to generate a seismic image of the subsurface region;

cross-correlating a modeled beam, derived from the seismic image and earth model, with a corresponding data beam within the data beam set;

storing in the computer storage media a cross-correlation value and a measured time shift for each pair of modeled beams and data beams having a cross-correlation value that exceed a determined threshold, and repeating the cross-correlating and storing operations until a determined number of data beams have been modeled; and inverting the measured time shifts to generate an updated earth model, having an updated velocity model, and iteratively repeating the migrating, cross-correlating, storing, and inverting operations until the measured time shifts are less than a determined tolerance, wherein the resulting updated earth model of the subsurface region is capable of generating an updated image that accurately describes the propagation of the data beams through the subsurface region.

19. The method of claim 18 wherein the operations of migrating, cross-correlating, storing, and inverting are iteratively repeated until the measured time shifts are less than a determined tolerance or until alignment of the beam pairs is determined visually by a user.

\* \* \* \* \*